March 11, 1952 W. A. POND 2,588,659
HIGH-VOLTAGE SUPPLY
Filed March 22, 1951
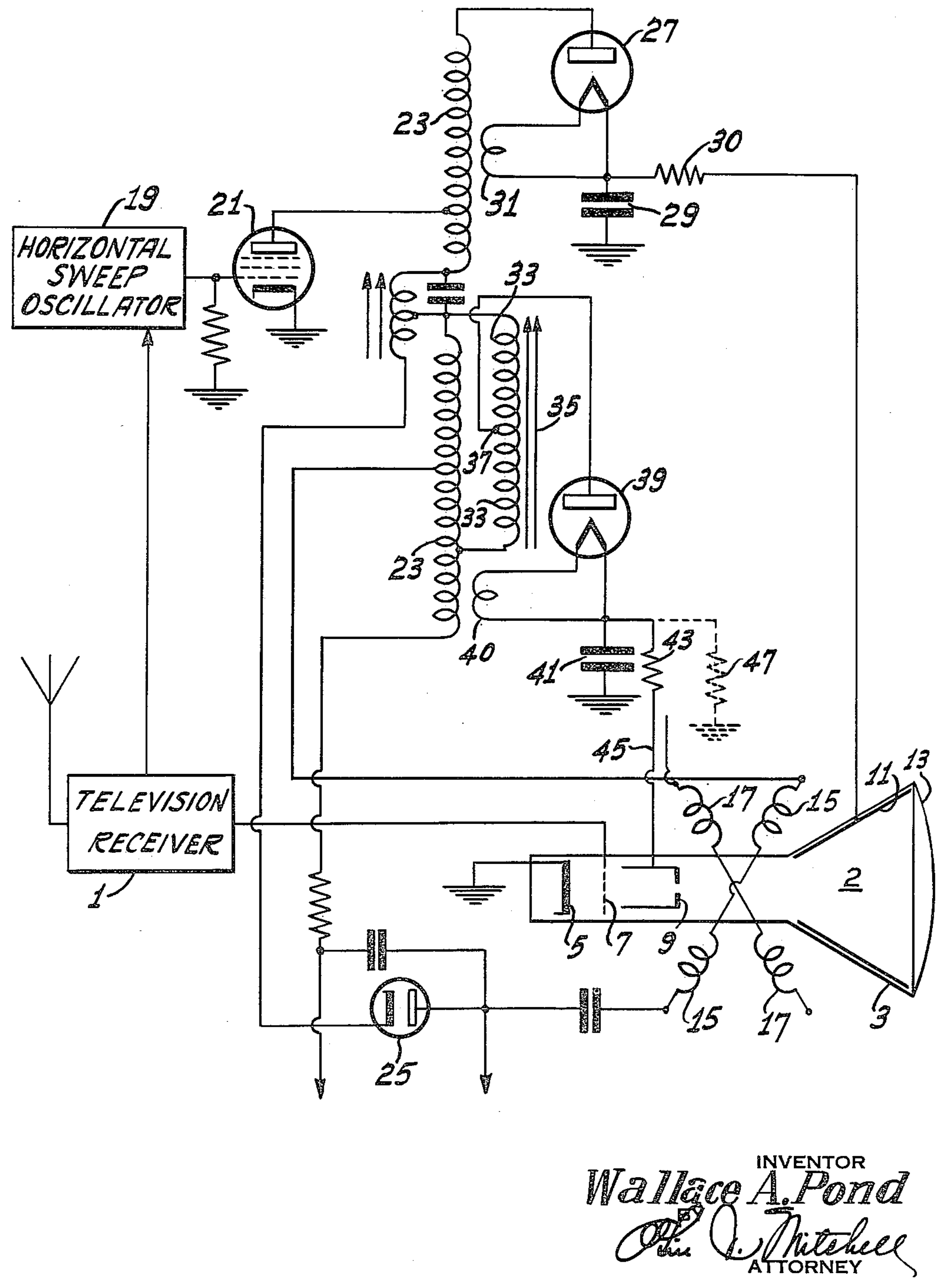
INVENTOR
Wallace A. Pond
BY Philip J. Mitchell
ATTORNEY Patented Mar. 11, 1952

2,588,659

UNITED STATES PATENT OFFICE 2,588,659

HIGH-VOLTAGE SUPPLY

Wallace A. Pond, River Grove, Ill., assignor to Radio Corporation of America, a corporation of Delaware Application March 22, 1951, Serial No. 216,925

2 Claims. (Cl. 315—17)

This invention relates to variable high voltage supply systems, and particularly to systems for supplying an adjustable voltage of high magnitude between the cathode and another electrode of a cathode ray tube.

In apparatus employing cathode ray tubes of the electrostatic focusing type, it is customary to apply a very high unidirectional positive potential to the second anode and a somewhat lower, adjustable, unidirectional positive potential to the first or focusing anode of the cathode ray tube. The first anode potential is made adjustable so that the cathode beam may be brought into focus. Thus, in a television receiver employing an electrostatically focused cathode ray tube, the "focus" adjustment in effect varies the potential impressed upon the first or focusing anode.

Heretofore it has been the usual practice to obtain the focusing potential by means of a conventional potentiometer voltage divider. Such a potentiometer arrangement is expensive, involves difficulties in insulating it for the high voltages involved, and has the further disadvantages of drawing an appreciable amount of current thereby draining power from the source, and of giving poor voltage regulation.

It is accordingly one object of this invention to provide an improved method of and means for obtaining an adjustable unidirectional high voltage.

It is another object of this invention to provide an improved method of and means for obtaining an adjustable unidirectional high voltage for the focusing anode of a cathode ray tube.

A further object of this invention is to provide an improved means for controlling the amplitude of a unidirectional voltage which produces a minimum load on the voltage source.

According to the invention, an adjustable potential for the focusing anode or focus electrode of a cathode ray tube is obtained by means of a tapped inductance connected across a part of the horizontal output transformer winding. By varying the ratio of the inductances of the two sides of the tapped inductance by such means as a variable core, a variable and adjustable potential is obtained at the tap. This voltage is rectified, filtered, and applied to the focus electrode.

Other and incidental objects of this invention will be apparent to those skilled in the art from a reading of the following specification and an inspection of the accompanying drawing, in which there is shown an embodiment of this invention.

Referring now to the drawing, this invention is shown applied to a television receiver 1 which includes an electrostatic focus picture tube 2. The particular picture tube illustrated is of a well known type comprising an evacuated envelope 3 having an electron gun therein which comprises a cathode 5, a control grid 7, and a first or focusing anode 9. A second anode 11, consisting of a conductive coating on the inside of the envelope 3, is provided for accelerating the electrons and for aiding in electrostatic focusing. The usual fluorescent screen 13 is provided at the large end of the tube.

In accordance with common practice, the picture tube is provided with one pair of deflecting coils 15 for deflecting the electron beam horizontally, and another pair of deflecting coils 17 for deflecting the electron beam vertically, whereby the fluorescent screen 13 may be scanned to produce a picture. Details relating to the television receiver and vertical deflection are not illustrated as any of the usual types may be employed, such as, for example, those shown and described in an article by A. Wright in RCA Review for March 1947.

A horizontal sweep oscillator 19 supplies a saw tooth potential to the grid of the horizontal sweep output tube 21, which in turn supplies a saw tooth current component to the output transformer 23. During the horizontal trace the deflection current increases linearly in the horizontal deflection coils 15, and a corresponding magnetic field is produced. During the retrace period the output tube 21 is cut off, and the sudden removal of plate current causes a sudden collapse of the magnetic field. This collapse in turn causes a high amplitude transient voltage pulse to appear across the horizontal deflection coils 15. A damper tube 25 prevents this transient voltage pulse from setting up a series of oscillations.

This high amplitude pulse, which has a peak amplitude of the order of several thousand volts, is stepped up by the horizontal output transformer 23, which is shown as an autotransformer. A high voltage rectifier 27 is connected between the high voltage terminal of transformer 23 and the second anode 11 of cathode ray tube 2. The high voltage rectifier 27 rectifies this transient voltage to produce, after filtering by capacitor 29 and a resistor 30, a constant high unidirectional potential. The filament of the high voltage rectifier 27 is energized by means of a few turns of wire 31 wound on the core of the horizontal output transformer 23.

The first or focusing anode potential, which is to be adjustable, is obtained as follows: a center tapped inductance 33 is connected across a part of the winding of the horizontal output transformer 23. The ratio of the inductances of the two sections of inductance 33 is varied by means of a variable core 35. A variable adjustable potential may thus be obtained at center tap 37. The potential obtained at the tap 37 is rectified by means of rectifier 39 whose anode is connected to tap 37 and whose cathode or filament is energized by the turns of wire 40, filtered by means of capacitor 41 and resistor 43, and applied to the focusing anode 9 of tube 2 by means of lead 45. A high resistance 47 may be provided to connect the focusing anode 9 to ground in order to prevent the build up on the focusing anode 9 of a potential due to interelectrode leakage currents.

It has been found desirable to design the inductance 33 so that the movement of the core 35 has as great an effect as possible on the ratio of the inductances of the two parts of inductance 33 and as small an effect as possible on the total inductance of inductance 33.

The two parts of inductance 33 form an inductance voltage divider whose parameters are altered by means of movable core 35, and it is obvious that inductance 33 may be replaced by two separate inductance elements having either a common core or two separate cores.

The adjustable high voltage focusing anode supply according to the invention consumes less power and has better regulation than the conventional potentiometer voltage divider.

Having thus described my invention, what is claimed is:

1. A high voltage power supply for an electrostatically focused cathode ray tube comprising a focus electrode, said high voltage power supply comprising a transformer, an inductance voltage divider comprising two inductance elements, means connecting said inductance voltage divider to said transformer, a rectifier having two electrodes, means connecting an electrode of said rectifier to a point on said inductance voltage divider intermediate to said inductance elements, means connecting the other electrode of said rectifier to said focus electrode, and means to alter the ratio of the inductances of said inductance elements.

2. A high volatge power supply for an electrostatically focused cathode ray tube comprising a first anode and a second anode, said high voltage power supply comprising a transformer, a first rectifier having an anode and a cathode, means connecting the anode of said first rectifier to said transformer, means connecting the cathode of said first rectifier to the second anode of said cathode ray tube, an inductance voltage divider, means connecting said inductance voltage divider to said transformer, a second rectifier having an anode and a cathode, means connecting the anode of said second rectifier to said inductance voltage divider, means connecting the cathode of said second rectifier to the first anode of said cathode ray tube, and means to alter the parameters of said inductance voltage divider.

WALLACE A. POND.

REFERENCES CITED

The following references are of record in the file of this patent:

UNITED STATES PATENTS

| Number | Name | Date |
|---|---|---|
| 2,188,647 | Busse | Jan. 30, 1940 |
| 2,218,764 | Moller et al. | Oct. 22, 1940 |
| 2,265,620 | Bahring | Dec. 9, 1941 |
| 2,397,150 | Lyman | Mar. 26, 1946 |
| 2,431,051 | Kozanowski | Nov. 18, 1947 |